US012145592B2

(12) United States Patent
Zhong et al.

(10) Patent No.: US 12,145,592 B2
(45) Date of Patent: Nov. 19, 2024

(54) SYSTEMS AND METHODS FOR MULTI-MODAL DATA AUGMENTATION FOR PERCEPTION TASKS IN AUTONOMOUS DRIVING

(71) Applicant: Robert Bosch GmbH, Stuttgart (DE)

(72) Inventors: Yiqi Zhong, Pasadena, CA (US); Xinyu Huang, San Jose, CA (US); Yuliang Guo, Palo Alto, CA (US); Liang Gou, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 339 days.

(21) Appl. No.: 17/702,034

(22) Filed: Mar. 23, 2022

(65) Prior Publication Data

US 2023/0303084 A1 Sep. 28, 2023

(51) Int. Cl.

*B60W 40/00* (2006.01)
*B60W 40/04* (2006.01)
*B60W 60/00* (2020.01)

(52) U.S. Cl.

CPC ............ *B60W 40/04* (2013.01); *B60W 60/00* (2020.02); *B60W 2420/403* (2013.01);

(Continued)

(58) Field of Classification Search

CPC ................. B60W 40/04; B60W 60/00; B60W 2420/403; B60W 2420/408;

(Continued)

(56) References Cited

U.S. PATENT DOCUMENTS

| | | | | |
|---|---|---|---|---|
| 10,733,463 | B1 * | 8/2020 | Jain | G06V 20/41 |
| 11,628,855 | B1 * | 4/2023 | Pradhan | G01S 17/58 701/24 |

(Continued)

FOREIGN PATENT DOCUMENTS

| | | | | |
|---|---|---|---|---|
| EP | 4152274 A1 * | 3/2023 | | G06V 10/82 |
| WO | WO-2022086739 A2 * | 4/2022 | | B60W 10/06 |
| WO | WO-2023160645 A1 * | 8/2023 | | |

OTHER PUBLICATIONS

Li, R et al., PointAugment: an Auto-Augmentation Framework for Point Cloud Classification, Proceedings of the IEEE/CVF Conference on Computer Vision and Pattern Recognition, 2020, 10 pages [online]. [retrived on Jul. 13, 2024]. Retrieved from the Internet <URL: https://arxiv.org/pdf/2002.10876> (Year: 2020).*

(Continued)

*Primary Examiner* — Peter D Nolan
*Assistant Examiner* — Peter Y Ning
(74) *Attorney, Agent, or Firm* — Dickinson Wright PLLC

(57) ABSTRACT

A method for performing at least one perception task associated with autonomous vehicle control includes receiving a first dataset and identifying a first object category of objects associated with the plurality of images, the first object category including a plurality of object types. The method also includes identifying a current statistical distribution of a first object type of the plurality of object types and determining a first distribution difference between the current statistical distribution of the first object type and a standard statistical distribution associated with the first object category. The method also includes, in response to a determination that the first distribution difference is greater than a threshold, generating first object type data corresponding to the first object type, configuring at least one attribute of the first object type data, and generating a second (Continued)

100
102
108, 112
106
104
110 dataset by augmenting the first dataset using the first object type data.

18 Claims, 14 Drawing Sheets

(52) U.S. Cl.
CPC ................ *B60W 2420/408* (2024.01); *B60W 2554/4023* (2020.02); *B60W 2554/4026* (2020.02)

(58) Field of Classification Search
CPC ... B60W 2554/4023; B60W 2554/4026; G06F 18/251; G06V 10/25; G06V 10/454; G06V 10/764; G06V 10/774; G06V 10/776; G06V 10/806; G06V 20/58; G06V 10/82
See application file for complete search history.

(56) References Cited

U.S. PATENT DOCUMENTS

2017/0355080 A1* 12/2017 Podnar .................. B25J 19/023
2019/0009133 A1* 1/2019 Mettler May ...... G09B 19/0038
2021/0073626 A1* 3/2021 Brahma ................ G06V 20/58
2021/0284184 A1* 9/2021 Song .................. B60W 60/001
2021/0334630 A1* 10/2021 Lambert ................ G06N 3/047
2021/0334651 A1* 10/2021 Leng ..................... G01S 17/894
2022/0035378 A1* 2/2022 Levi .......................... G06T 7/73
2022/0067983 A1* 3/2022 Fidler .................... G06V 20/58
2022/0114406 A1* 4/2022 Wyffels ............. G06F 18/24155
2022/0153314 A1* 5/2022 Suo ................. B60W 60/00276
2022/0164602 A1* 5/2022 Frtunikj .............. G06F 18/2115
2022/0237419 A1* 7/2022 Wyffels .................. G06V 10/70
2022/0261593 A1* 8/2022 Yu .......................... G06N 3/088
2023/0121812 A1* 4/2023 Yin ...................... G06V 10/774
706/15
2023/0135293 A1* 5/2023 Chien .................. G06F 40/279
704/9
2023/0196723 A1* 6/2023 Diesendruck ............. G06T 7/11
382/125
2023/0360255 A1* 11/2023 Kocamaz .................. G06T 7/20

OTHER PUBLICATIONS

Carstensen, Jr. et al., "GeoSin: A GIS-Based Simulation Laboratory for Introductory Geography," Journal of Geography, 1993, vol. 92, No. 5, 6 pages.
Fang et al., "LiDAR-Aug: A General Rendering-based Augmentation Framework for 3D Object Detection," Proceedings of the IEEE/CVF Conference on Computer Vision and Pattern Recognition, 2021, 11 pages.
Li et al., "PointAugment: an Auto-Augmentation Framework for Point Cloud Classification," Proceedings of the IEEE/CVF Conference on Computer Vision and Pattern Recognition, 2020, 10 pages.
Manivasagam et al., "LiDARsim: Realistic LiDAR Simulation by Leveraging the Real World," Proceedings of the IEEE/CVF Conference on Computer Vision and Pattern Recognition, 2020, 10 pages.

* cited by examiner

SYSTEMS AND METHODS FOR MULTI-MODAL DATA AUGMENTATION FOR PERCEPTION TASKS IN AUTONOMOUS DRIVING

TECHNICAL FIELD

The present disclosure relates to computer systems that have capability for artificial intelligence, including neural networks. In embodiments, this disclosure relates to using multi-modal data augmentation for perception tasks in autonomous driving.

BACKGROUND

In development of data for training machine learning models, data collection and labeling is a laborious, costly, and time-consuming venture, which may represent a major bottleneck in most current machine learning pipelines. In particular, recent perception models in self-driving industry have started to focus on the use of multi-modal data fusion. Typically, the multi-modal data is associated with one or more red-green-blue (RGB) cameras and/or one or more light detection and ranging (LiDAR) sensors. This typically requires the annotations of multi-modal data from several sensors to be synchronized, which may be relatively difficult. Furthermore, when collecting real world data for annotation, such data is typically limited to real traffic data of a certain time period from a few environments (e.g., cities and the like). Thus, even a well-annotated dataset is not able to cover all the scenarios that an autonomously operated vehicle may face.

SUMMARY

An aspect of the disclosed embodiments includes a method for performing at least one perception task associated with autonomous control of a vehicle. The method includes receiving a first dataset, the first dataset including plurality of images corresponding to at least one environment of the vehicle, and identifying a first object category of objects associated with the plurality of images, the first object category including a plurality of object types. The method also includes identifying a current statistical distribution of a first object type of the plurality of object types and determining a first distribution difference between the current statistical distribution of the first object type and a standard statistical distribution associated with the first object category. The method also includes, in response to a determination that the first distribution difference is greater than a threshold, generating first object type data corresponding to the first object type. The method also includes configuring at least one attribute of the first object type data and generating a second dataset by augmenting the first dataset using the first object type data.

Another aspect of the disclosed embodiments includes a system for performing at least one perception task associated with autonomous control of a vehicle. The system includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution associated with the first object category; in response to a determination that the first distribution difference is greater than a threshold, generate first object type data corresponding to the first object type; configure at least one attribute of the first object type data; and generate a second dataset by augmenting the first dataset using the first object type data.

Another aspect of the disclosed embodiments includes an apparatus for performing at least one perception task associated with autonomous control of a vehicle. The apparatus includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution that corresponds to a data distribution of the first object category; in response to a determination that the first distribution difference is greater than a threshold, generate first object type data corresponding to the first object type; configure at least one attribute of the first object type data; generate a second dataset by augmenting the first dataset using the first object type data; train a machine learning model trained using the second dataset, the machine learning model being configured to perform at least one perception task associated with autonomous control of the vehicle; and perform at least one perception task of the vehicle using output provided by the machine learning model.

DETAILED DESCRIPTION

Figure 1:
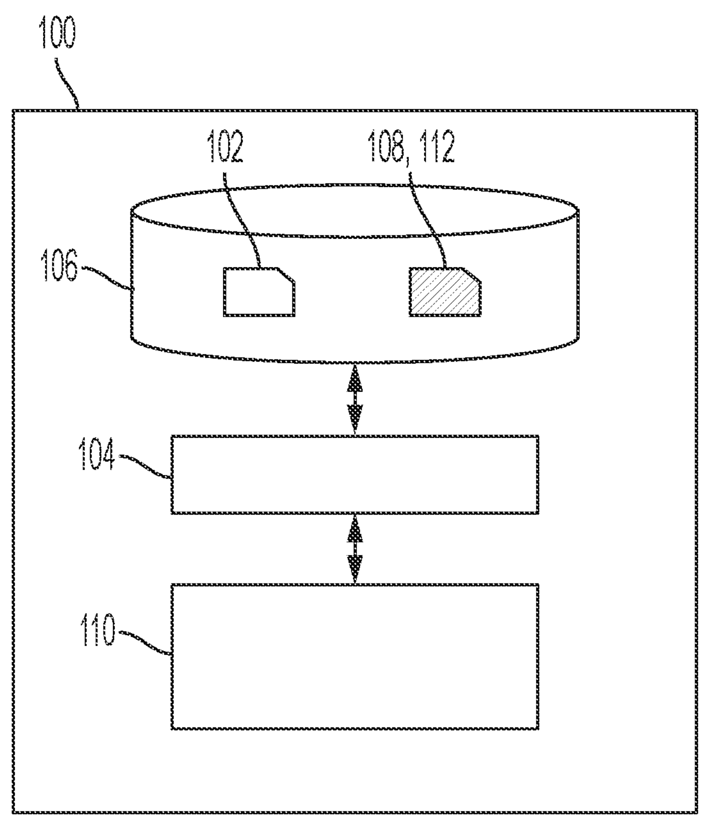
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, in development of data for training machine learning models, data collection and labeling is a laborious, costly, and time-consuming venture, which may represent a major bottleneck in most current machine learning pipelines. In particular, recent perception models in self-driving industry have started to focus on the use of multi-modal data fusion. Typically, the multi-modal data is associated with one or more red-green-blue (RGB) cameras and/or one or more light detection and ranging (LiDAR) sensors. This typically requires the annotations of multi-modal data from several sensors to be synchronized, which may be relatively difficult. Furthermore, when collecting real world data for annotation, such data is typically limited to real traffic data of a certain time period from a few environments (e.g., cities and the like). Thus, even a well-annotated dataset is not able to cover all the scenarios that an autonomously operated vehicle may face.

Typically, two main challenges in data annotation for use in performing by a machine learning model, perception tasks for autonomous vehicle control. First, annotation may be relatively resource intensive (e.g., including financial resources and the like). Second, the limited nature of the data may lead to a distorted distribution, which may lower the performance of a machine learning model trained using such data. As data augmentation is a crucial task for software using machine learning-based frameworks, such challenges may be problematic.

Accordingly, systems and methods, such as those described herein, configured to overcome such challenges, using an improved data augmentation strategy that decreases the burden of data annotation and improves data quality, may be desirable. In some embodiments, the systems and methods described herein may be configured to multi-modal data augmentation for perception tasks in autonomous vehicle control.

Figure 3A:
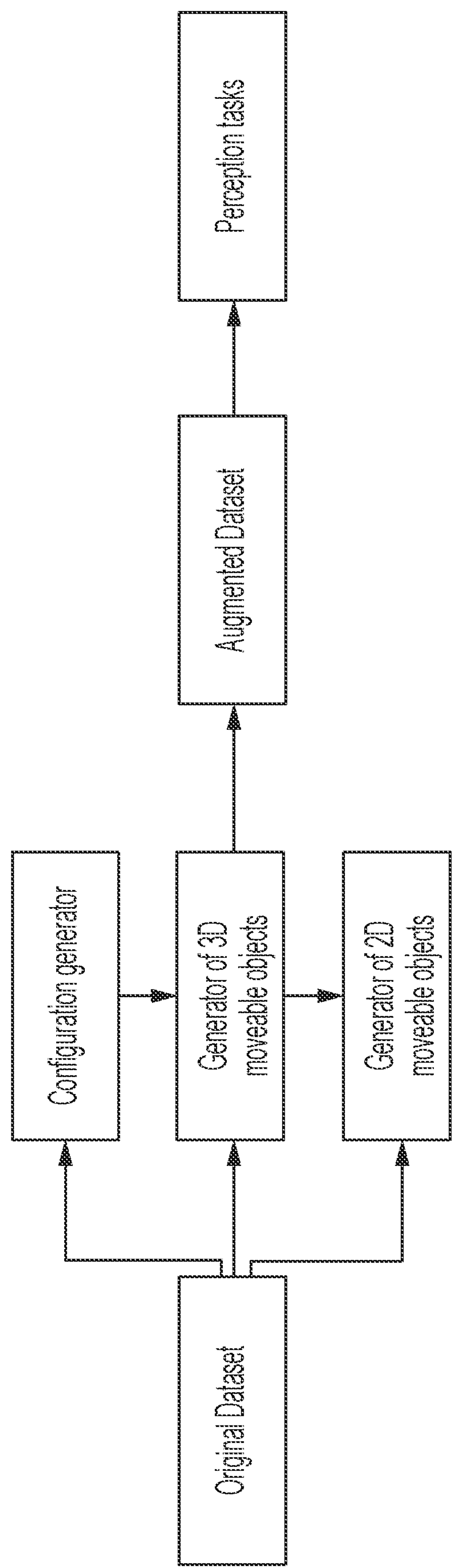
FIGS. 3A-3F generally illustrate various machine learning pipelines, according to the principles of the present disclosure.

The systems and methods described herein may be configured to provide, at least, a two-dimensional (2D) RGB image modality and a three-dimensional (3D) LiDAR scan modality. The systems and methods described herein may be configured to provide a configuration generator, a 3D data generator, and a 2D data generator for augmented movable object, as is generally illustrated in FIG. 3A. The systems and methods described herein may be configured to build an effective, light-weight data augmentation pipeline for autonomous vehicle control tasks and/or other suitable tasks using machine learning techniques.

The systems and methods described herein may be configured to use the configuration generator is to configure each augmented object (e.g., including attributes such as location, orientation, and the like). The systems and methods described herein may be configured to configure each augmented object based on the data distribution in the original dataset (e.g., which differs from typically solutions that may randomly "copy and paste" object for data augmentation).

Figure 3B:
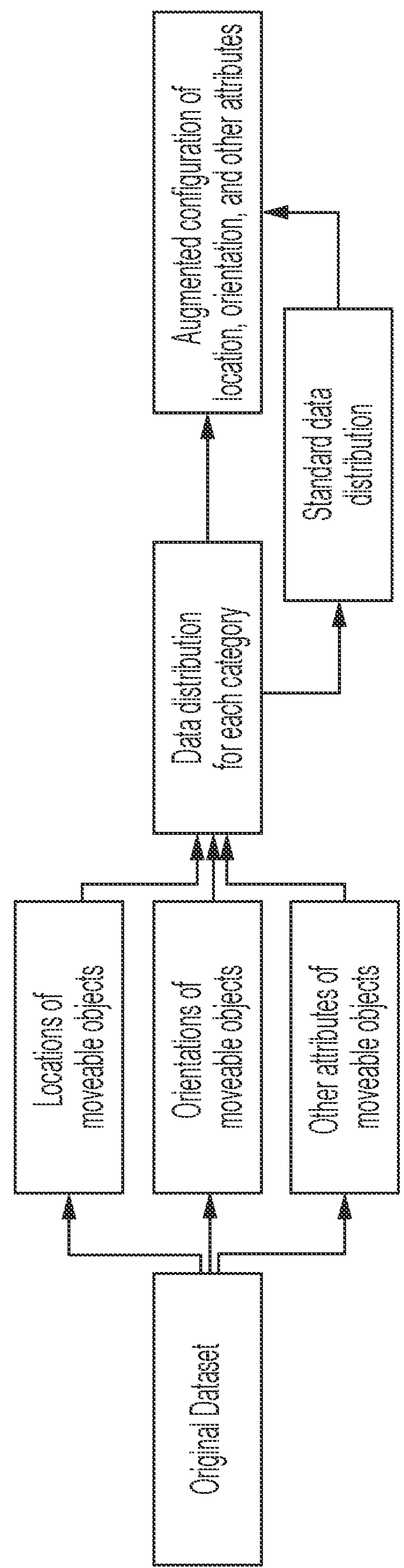

As is generally illustrated in FIG. 3B, the systems and methods described herein may be configured to provide a framework for the configuration generator. The systems and methods described herein may be configured to use the original dataset to identify moveable objections rarely or never indicated in the original dataset. The systems and methods described herein may be configured to using the configuration generator to configure locations, orientations, and/or other attributes of the movable objects. The systems and methods described herein may be configured to determine a data distribution for each category based on a standard data distribution. The systems and methods described herein may be configure to provide the augmented configuration of location, orientation, and/or other attributes.

The systems and methods described herein may be configured to provide a standard data distribution for each attribute in the configuration of each object category (e.g., which may include the data distribution in the real world). The systems and methods described herein may be configured to augment the movable objects such that the augmentation moves the data distribution of the current training set (e.g., the original dataset or a previously augmented dataset) closer to the standard distribution. The systems and methods described herein may be configured to, when sampling the configuration of each object, consider the configuration that moves the current distribution to the standard distribution the most, as the highest probability configuration.

Figure 3C:
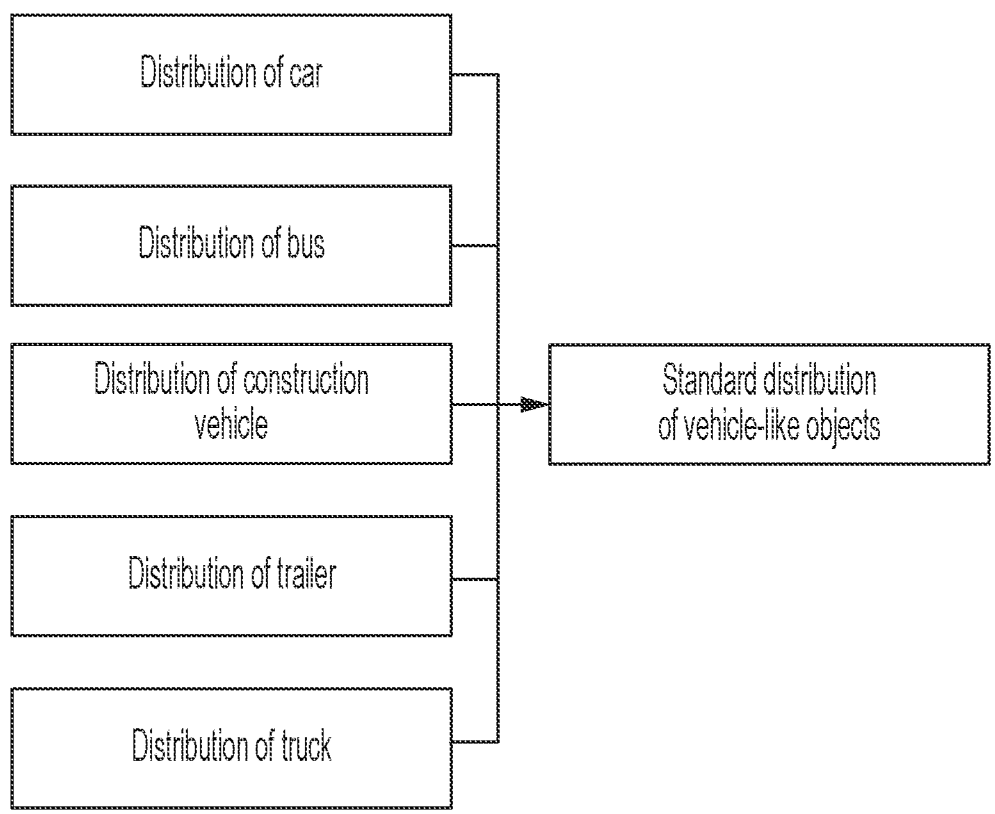

In some embodiments, the systems and methods described herein may be configured to regard the distribution of all types of vehicles (e.g., which may be referred to herein as object types) in a dataset as an approximated standard distribution of the vehicle-like category. The systems and methods described herein may be configured to calculate the difference between the current distribution of the rare category and the approximated standard distribution and use it as the probability map to effectively sample the configurations. An approximation of standard distribution for the vehicle-like category is generally illustrated in FIG. 3C. It should be understood that, while vehicle type distribution is described herein, the systems and methods described herein may be configured to use any suitable data and any suitable objects of such data, in addition to or instead of those described herein. For example, the systems and methods described herein may be configured to group small and/or middle-size moveable objects together to generate another standard distribution for small and/or middle-size movable objects. Additionally, or alternatively, the systems and methods described herein may be configured to obtain standard distributions other sources such as other datasets and/or aggregation of multiple datasets.

In some embodiments, the systems and methods described herein may be configured to generate augmented configurations using various suitable techniques including, in addition to, or instead of those described herein. For instance, the systems and methods described herein may be configured to replace an existing object with a new object in the dataset. The systems and methods described herein may be configured to apply probability density function (PDF)-based method. The road information and/or estimated occupancy maps can be further applied in these techniques. For example, the systems and methods described herein may be configured to, responsive to receiving or obtaining road information (e.g., from high-definition maps, plane fitting methods, road segmentation methods, and/or other methods) of a road in an environment of an autonomous vehicle, place an augmented vehicle on the road without collisions. In some embodiments, the systems and methods described herein may be configured to provide an occupancy map that may act as a mask indicating the empty spaces in the LiDAR scan.

Figure 3D:
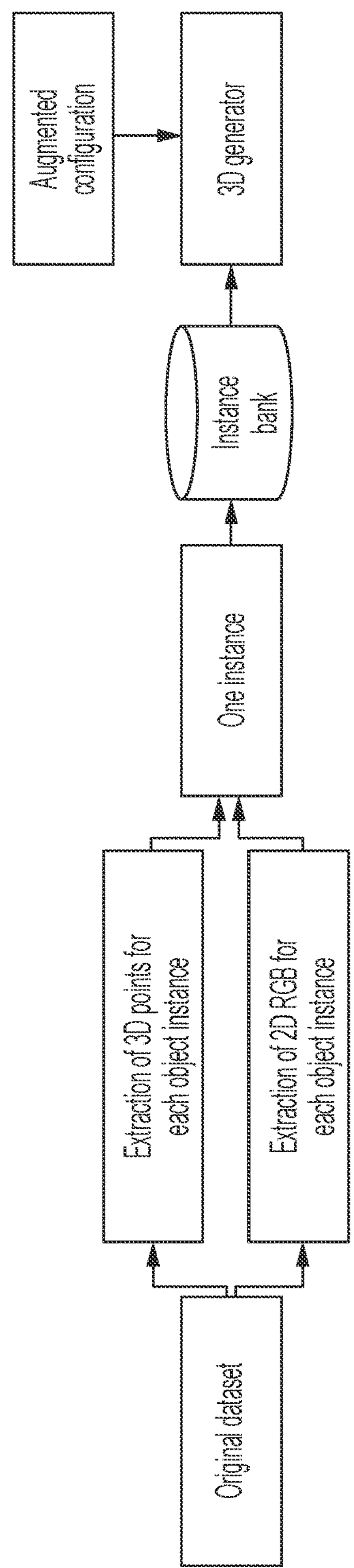

As is generally illustrated in FIG. 3D, the systems and methods described herein may be configured to provide an instance bank building process. In the instance bank, each instance has a respective point cloud set data as the 3D data. The systems and methods described herein may be configured to provide, for each 3D point in the instance bank, a relatively small portion of an RGB image as 2D data for each instance, such that the instance bank is a multi-modal (e.g., 3D points and associated 2D RGB patches) instance bank.

In some embodiments, the systems and methods described herein may be configured to, using the 3D generator, resize, rotate, translate, and the like, dense point cloud sets. The systems and methods described herein may be configured to generate an output that includes the sparse object point cloud sets with a LiDAR scanning effect. The systems and methods described herein may be configured to project the sparse scene point cloud along with the dense point cloud sets of the augmented objects to range view and compare the range view of the scene point cloud alone. The difference pixels between the two range views indicates which point cloud to be updated or dropped. In some embodiments, the systems and methods described herein may be configured to build a deep neural network to learn how the points are dropped.

Figure 3E:
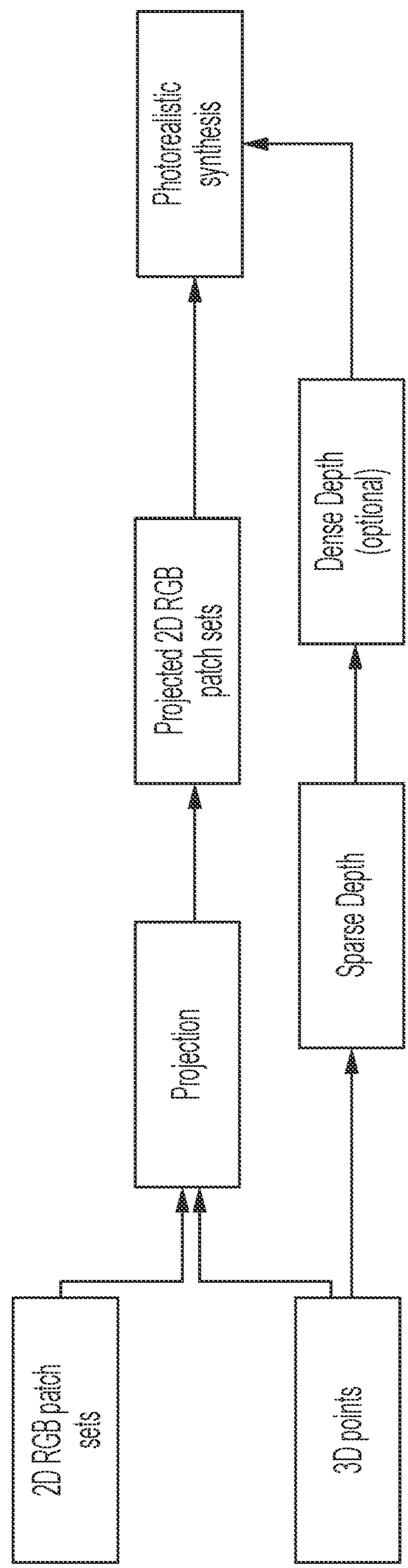
Figure 3F:
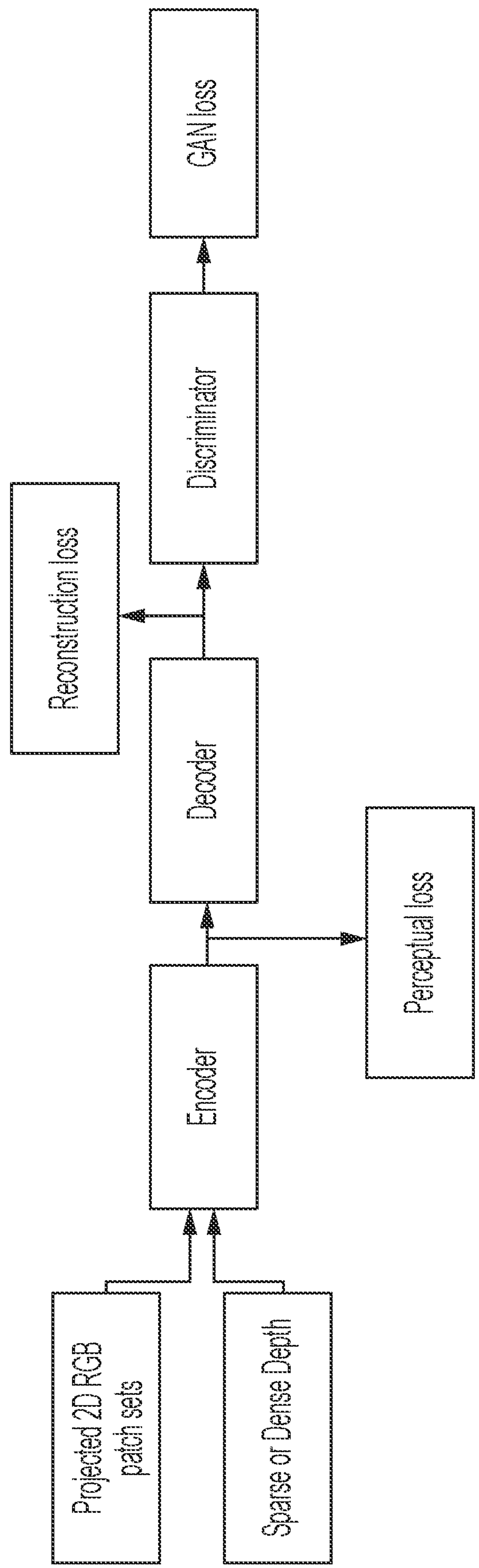

As is generally illustrated in FIG. 3E, the systems and methods described herein may be configured to, using the 2D generator, use the sparse RGB patch sets as input and output a dense RGB image. For example, the systems and methods described herein may be configured to formulate this process as a photorealistic synthesis task. The systems and methods described herein may be configured to train a generative adversarial network (GAN) like network (e.g., as is generally illustrated in FIG. 3F), which may use the sparse patch sets and corresponding depth map (e.g., from LiDAR data) as input. The systems and methods described herein may be configured to teach the network the mapping between the dense RGB output and the input. The systems and methods described herein may be configured to, for the object appearance generated, synthesize the objects to the original scene in the train set to build the augmented training set.

In some embodiments, the systems and methods described herein may be configured to provide multi-modal (2D+3D) data augmentation that includes of three generators (e.g., the configuration generator, the generator of 3D movable objects, and the generator of 2D movable objects). The systems and methods described herein may be configured to generate, using the configuration generator, new locations, orientations, and/or other attributes based on standard data distribution. The systems and methods described herein may be configured to, using the generator of 3D movable objects, generate augmented objects that include both 3D points and 2D RGB patch sets based on augmented configurations. The systems and methods described herein may be configured to, using the generator of 2D movable objects, output photorealistic objects from projected 2D RGB patch sets and depth maps.

In some embodiments, the systems and methods described herein may be configured to receive a first dataset. The first dataset may include plurality of images corresponding to at least one environment of a vehicle. The systems and methods described herein may be configured to identify a first object category of objects associated with the plurality of images. The first object category may include a plurality of object types. The systems and methods described herein may be configured to identify a current statistical distribution of a first object type of the plurality of object types. The systems and methods described herein may be configured to determine a first distribution difference between the current statistical distribution of the first object type and a standard statistical distribution associated with the first object category. The standard statistical distribution may correspond to a data distribution of the first object category.

The systems and methods described herein may be configured to, in response to a determination that the first distribution difference is greater than a threshold, generate first object type data corresponding to the first object type. The systems and methods described herein may be configured to configure at least one attribute of the first object type data. The at least one attribute of the first object type data may include a location attribute, an orientation attribute, any other suitable attribute, or a combination thereof.

The systems and methods described herein may be configured to generate a second dataset by augmenting the first dataset using the first object type data. The systems and methods described herein may be configured to generate two-dimensional object data based on the first object type data. In some embodiments, the systems and methods described herein may be configured to augment the first dataset using the first object type data by augmenting the first dataset to include the two-dimensional object data.

In some embodiments, the systems and methods described herein may be configured to generate three-dimensional object data based on the first object type data. The systems and methods described herein may be configured to augment the first dataset using the first object type data by augmenting the first dataset to include the three-dimensional object data. In some embodiments, the systems and methods described herein may be configured to fuse the two-dimensional object data associated with the first object type data with corresponding the three-dimensional object data associated with the first object type data. The systems and methods described herein may be configured to augment the first dataset using the first object type data by augmenting the first dataset based on the fused two-dimensional object data and the three-dimensional object data. In some embodiments, the systems and methods described herein may be configured to perform, by a machine learning model trained using the second dataset, at least one perception task associated with autonomous control of the vehicle.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
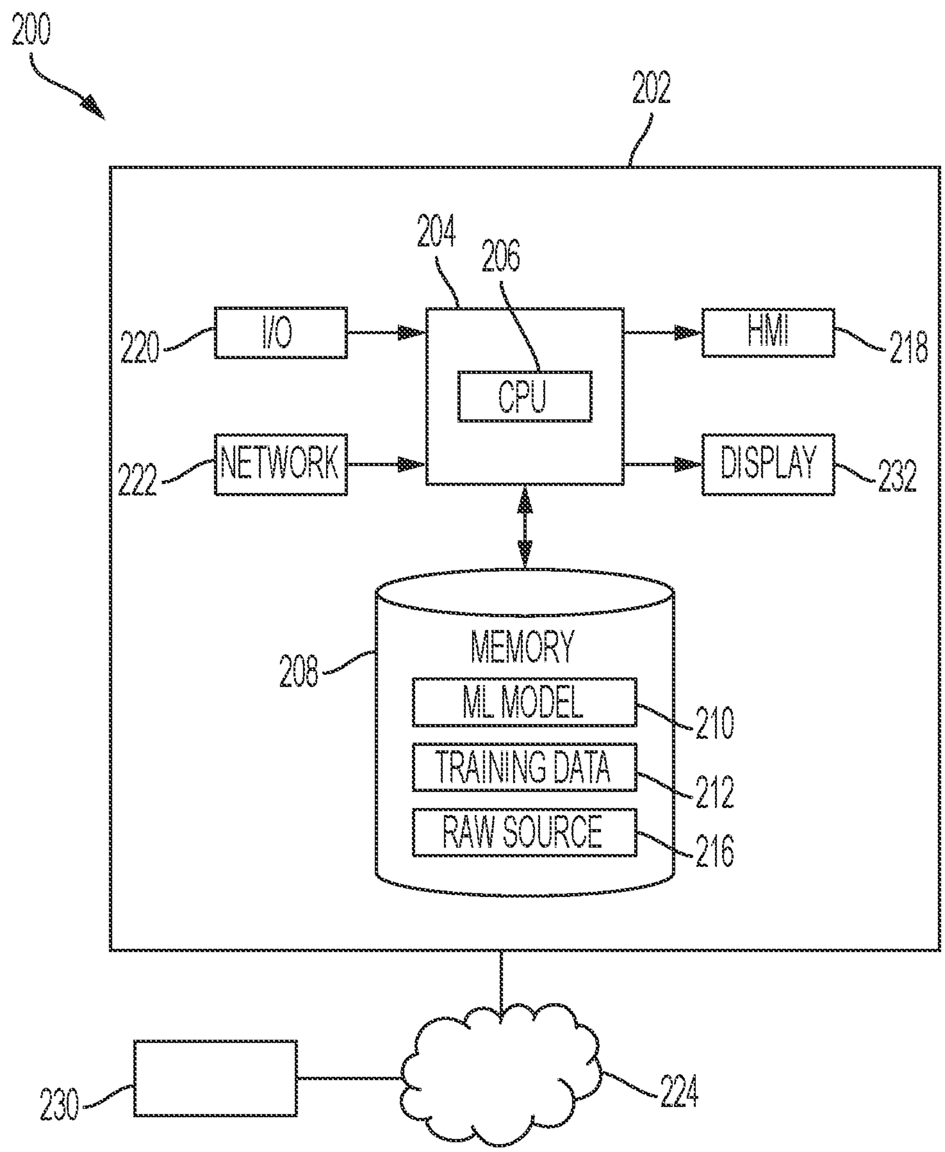
FIG. 2 generally illustrates a computer-implemented method for training and utilizing a neural network, according the principles of the present disclosure.

FIG. 2 depicts a data annotation/augmentation system 200 to implement a system for annotating and/or augment data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., pedestrian). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In the example, the machine-learning algorithm 210 may process raw source data 216 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

In some embodiments, the system 200 may be configured to augment the training dataset 212. For example, the system 200 may receive the training dataset 212. The system 200 may identify a first object category of objects associated with the plurality of images of the training dataset 212. The first object category may corresponding vehicle objects or other suitable objects identified in the plurality of images. The first object category may include a plurality of object types. The plurality of object types may correspond to vehicle types (e.g., trucks, cars, vans, buses, motorcycles, semi-trucks, trailers, and the like).

The system 200 may identify a current statistical distribution of a first object type of the plurality of object types. The system 200 may determine a first distribution difference between the current statistical distribution of the first object type and a standard statistical distribution associated with the first object category. The standard statistical distribution may correspond to a data distribution of the first object category.

The system 200 may, in response to a determination that the first distribution difference is greater than a threshold (e.g., indicating that one or more objects of the first object type is under represented in the plurality of images), generate first object type data corresponding to the first object type. The first object type data may include or correspond to movable objects, such as types of vehicles that are rarely or never indicated by the plurality of images. The system 200 may configure at least one attribute of the first object type data. The at least one attribute of the first object type data may include a location attribute, an orientation attribute, any other suitable attribute, or a combination thereof.

The system 200 may generate a second dataset by augmenting the training dataset 212 using the first object type data. The system 200 may generate 2D object data based on the first object type data. The system 200 may augment the training dataset 212 to include the 2D object data.

In some embodiments, system 200 may generate 3D object data based on the first object type data. The system 200 may augment the training dataset 212 to include the three-dimensional object data. In some embodiments, system 200 may fuse the 2D object data associated with the first object type data with corresponding the 3D object data associated with the first object type data. The system 200 may augment the training dataset 212 based on the fused 2D object data and the 3D object data.

In some embodiments, the system 200 may train the machine learning algorithm (e.g., which may be referred to herein as the machine learning model) 210. The system 200 may communicate the machine learning algorithm 210 to a controller of the vehicle. The controller of the vehicle 200 may include an autonomous driving controller or other suitable controller. The controller of the vehicle may perform, using the machine learning algorithm 210, at least one perception task (e.g., including, but not limited to, identifying objects in an environment corresponding to a route being traversed by the vehicle) associated with autonomous control of the vehicle. The machine learning algorithm 210 may provide an output that includes a predication (e.g., corresponding to at least one identified object). Additionally, or alternatively, the system 200 may remotely communicate with the vehicle and may perform, using the machine learning algorithm 210, the one or more perception tasks. The system 200 may provide the prediction output, generated by the machine learning algorithm 210, to the controller of the vehicle. The controller of the vehicle may provide autonomous control or semi-autonomous control of the vehicle based on the prediction output of the perception task.

Figure 4:
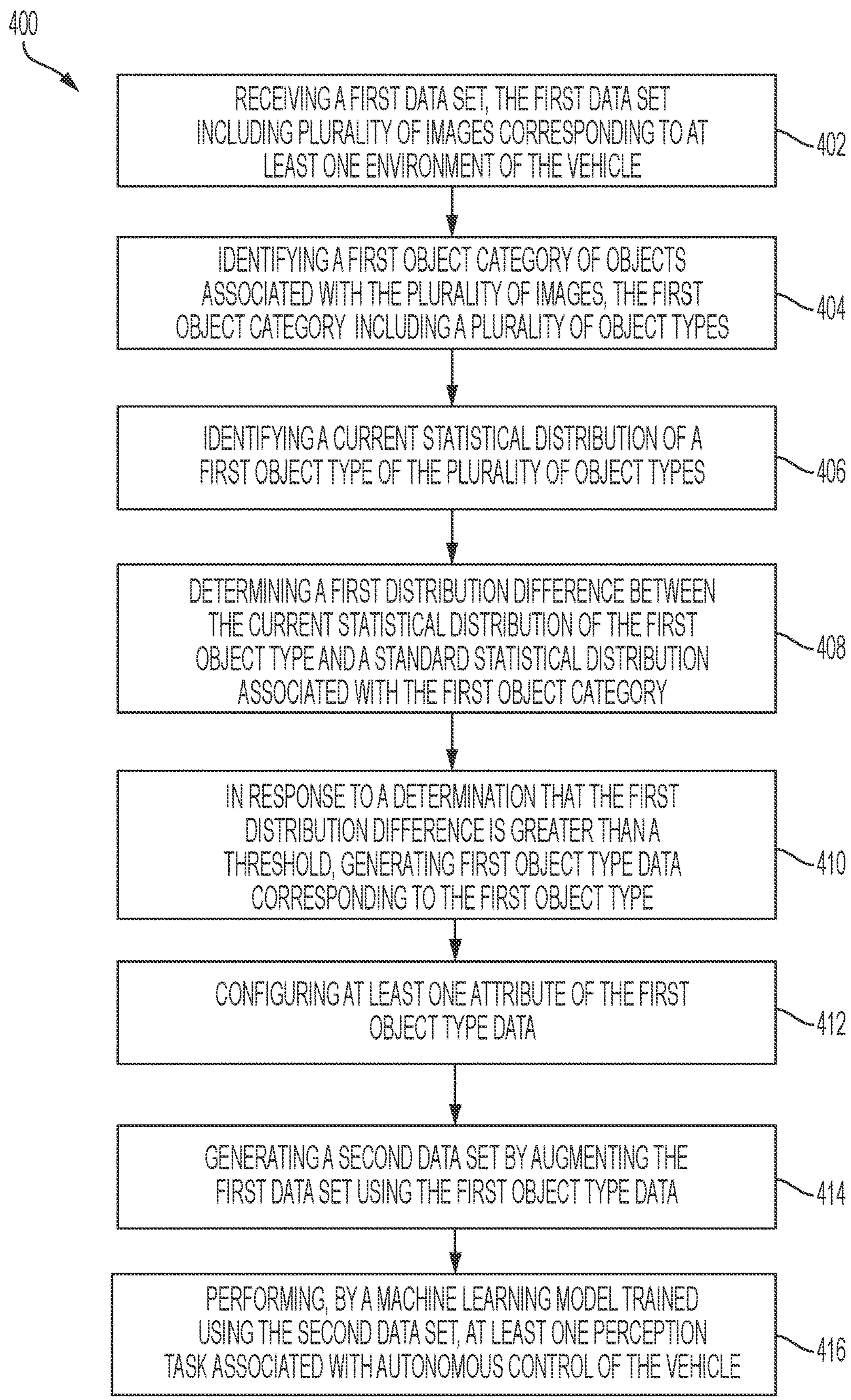
FIG. 4 is a flow diagram generally illustrating an autonomous vehicle control method, according to the principles of the present disclosure.

FIG. 4 is a flow diagram generally illustrating an autonomous vehicle control method 400 according to the principles of the present disclosure. At 402, the method 400 receives a first dataset, the first dataset including plurality of images corresponding to at least one environment of the vehicle. For example, the system 200 may receive the training dataset 212.

At 404, the method 400 identifies a first object category of objects associated with the plurality of images, the first object category including a plurality of object types. For example, the system 200 may identify the first object category.

At 406, the method 400 identifies a current statistical distribution of a first object type of the plurality of object types. For example, the system 200 may identify the current statistical distribution of the first object type.

At 408, the method 400 determines a first distribution difference between the current statistical distribution of the first object type and a standard statistical distribution associated with the first object category. For example, the system 200 may determine the first distribution difference between the current statistical distribution and the standard statistical distribution.

At 410, the method 400, in response to a determination that the first distribution difference is greater than a threshold, generates first object type data corresponding to the first object type. For example, the system 200 may, in response to the determination that the first distribution difference is greater than the threshold, generates the first object type data.

At 412, the method 400 configures at least one attribute of the first object type data. For example, the system 200 may configure the at least one attribute of the first object type data.

At 414, the method 400 generates a second dataset by augmenting the first dataset using the first object type data. For example, the system 200 may generate the second dataset by augmenting the training dataset 212 using the first object type data.

At 416, the method 400 performs, by a machine learning model trained using the second dataset, at least one perception task associated with autonomous control of the vehicle. For example, the system 200 may train the machine learning algorithm 210 using the augmented training dataset 212. The machine learning algorithm 210 may be used (e.g., by the system 200, the controller of the vehicle, another computing device, or a combination thereof) to generate a prediction output in response to performing the at least one perception task. The controller of the vehicle may provide autonomous or semi-autonomous control of the vehicle based on the prediction output.

Figure 5:
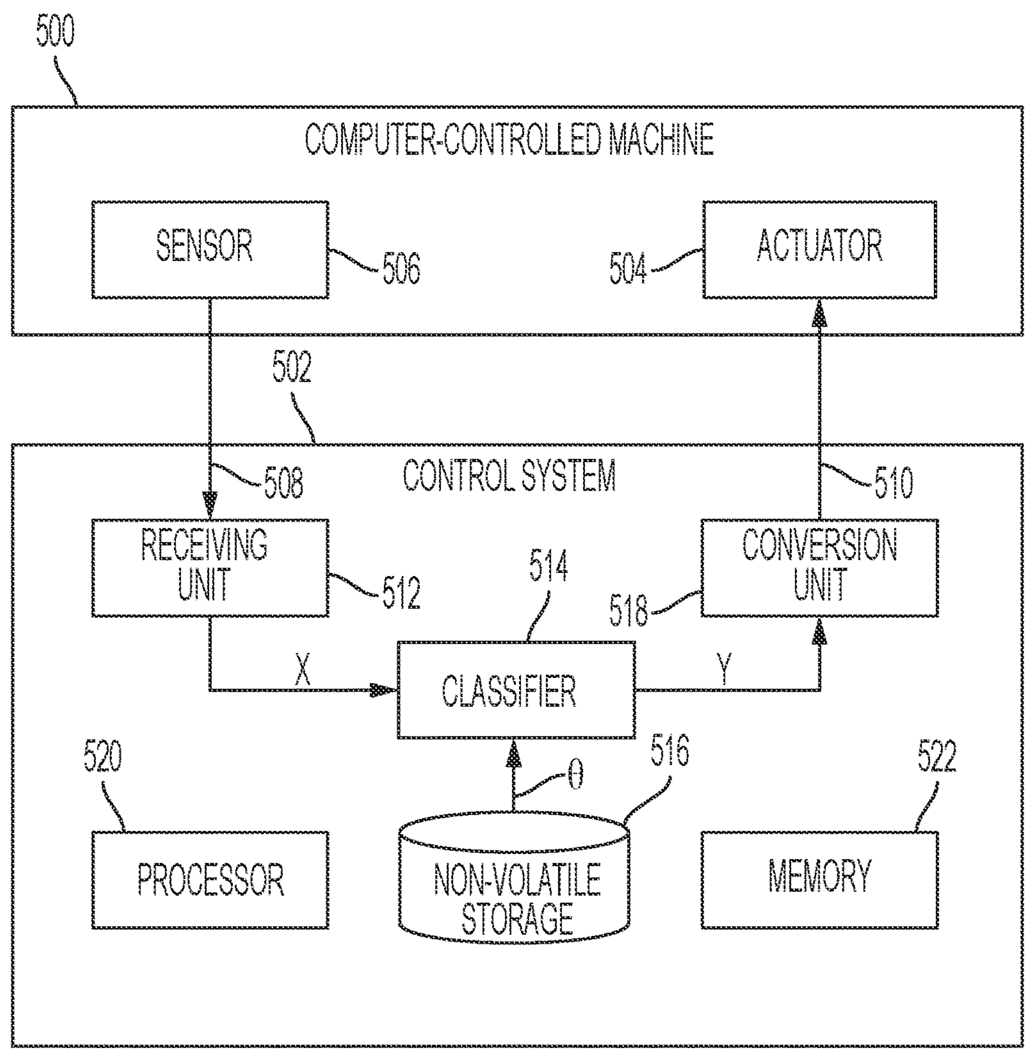
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
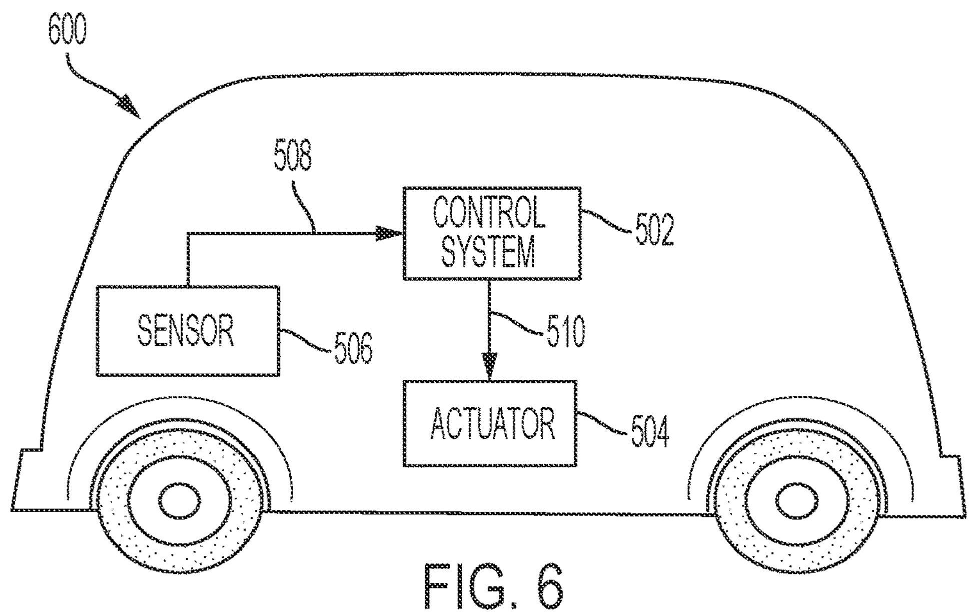
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
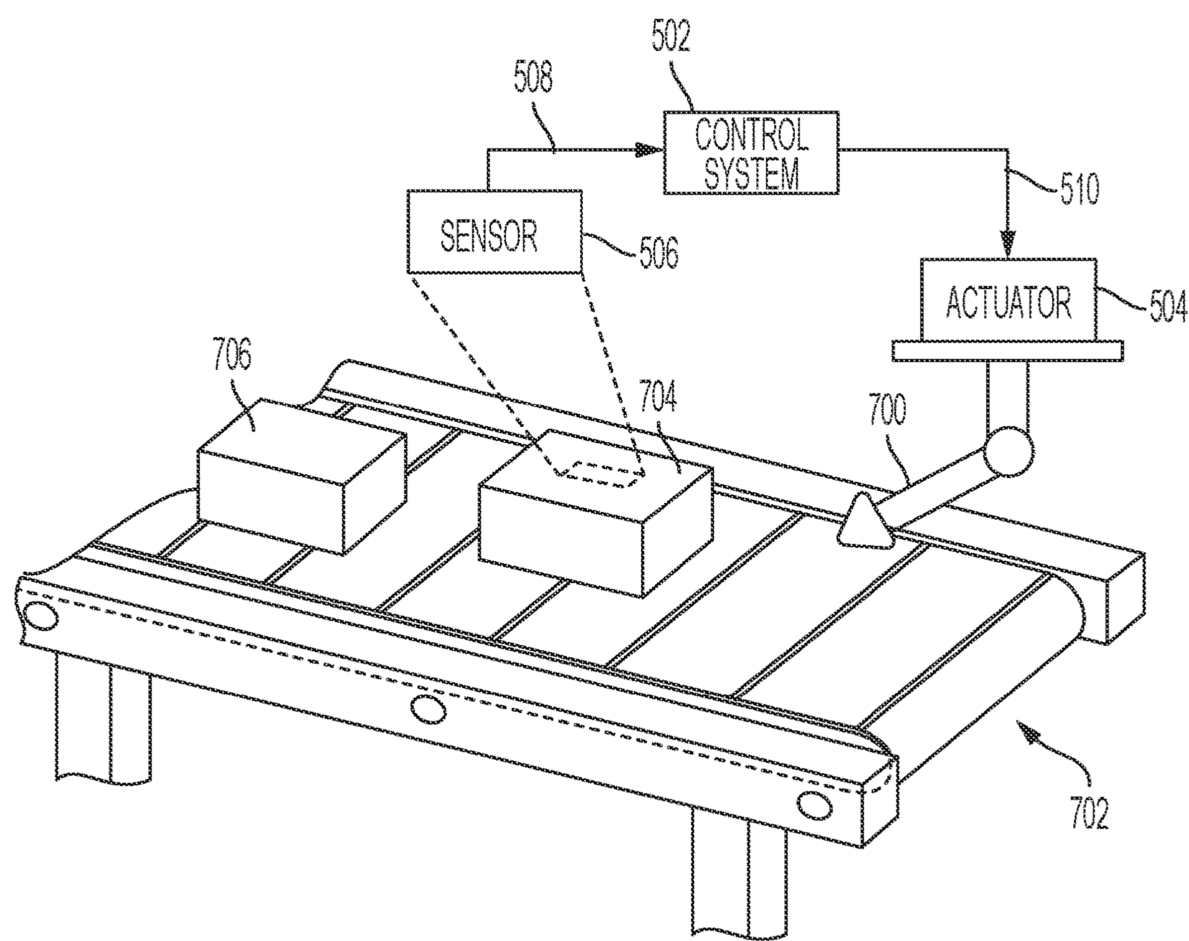
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
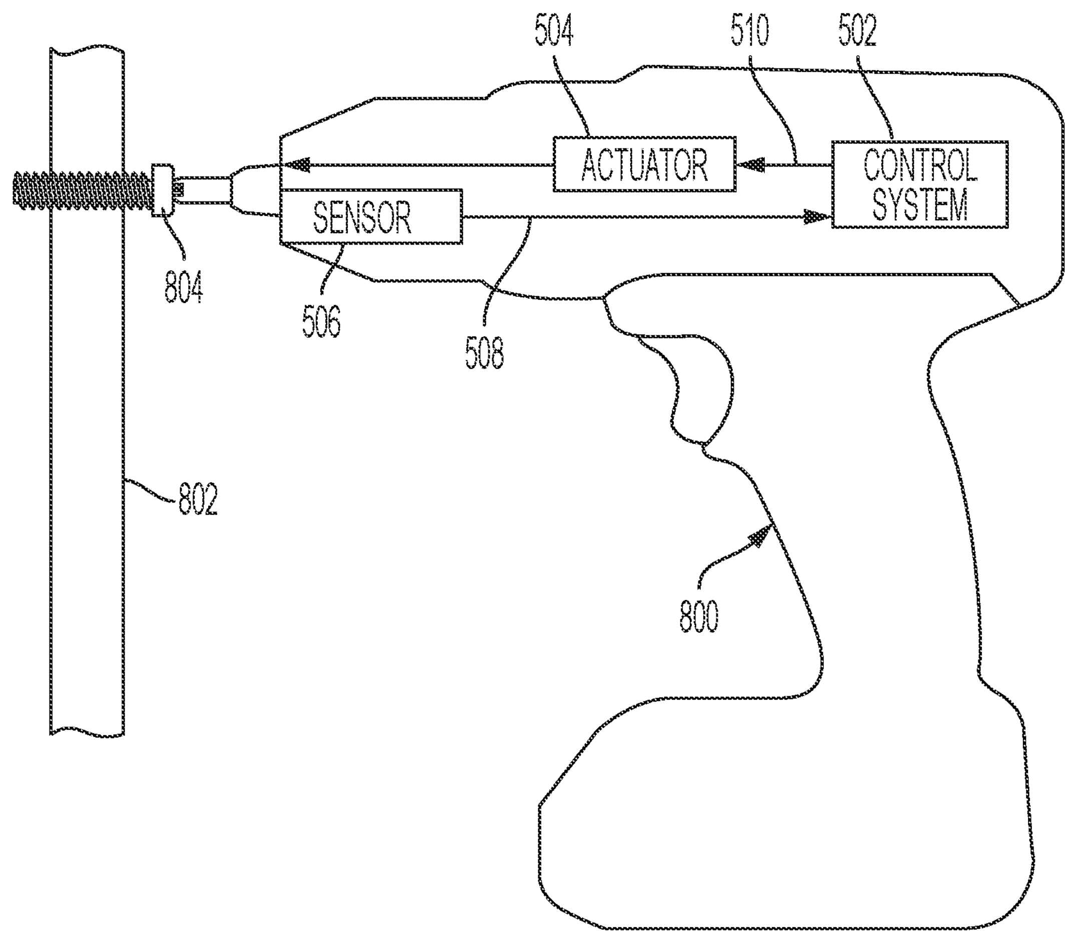
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
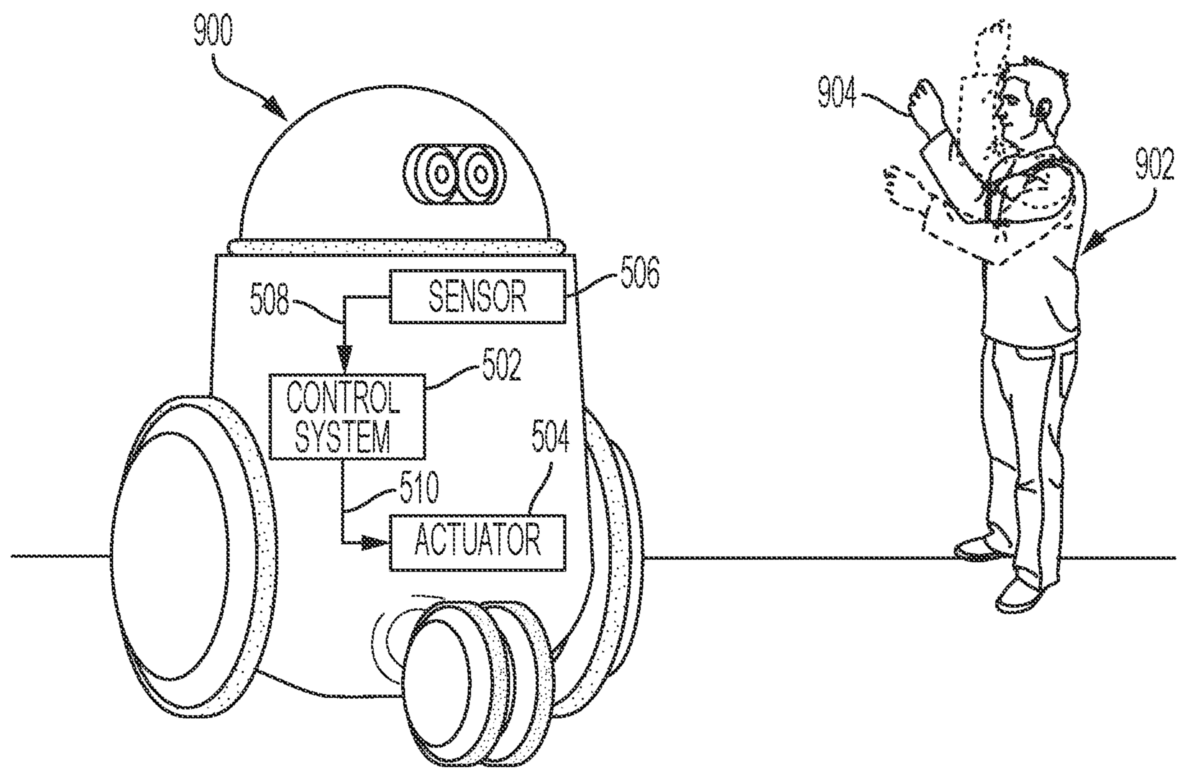
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
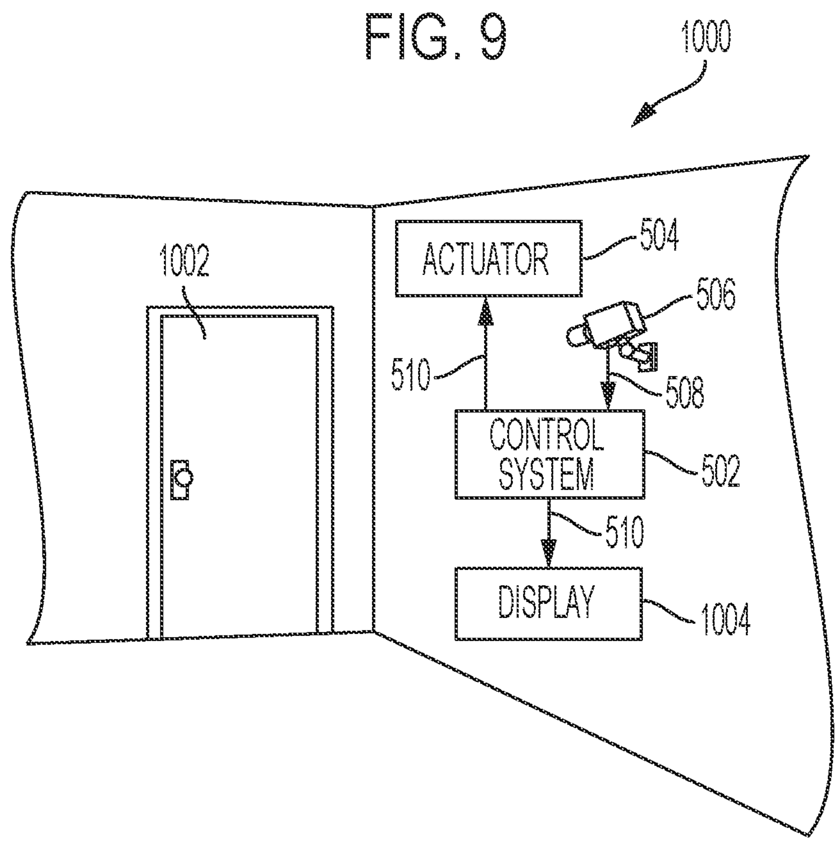
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
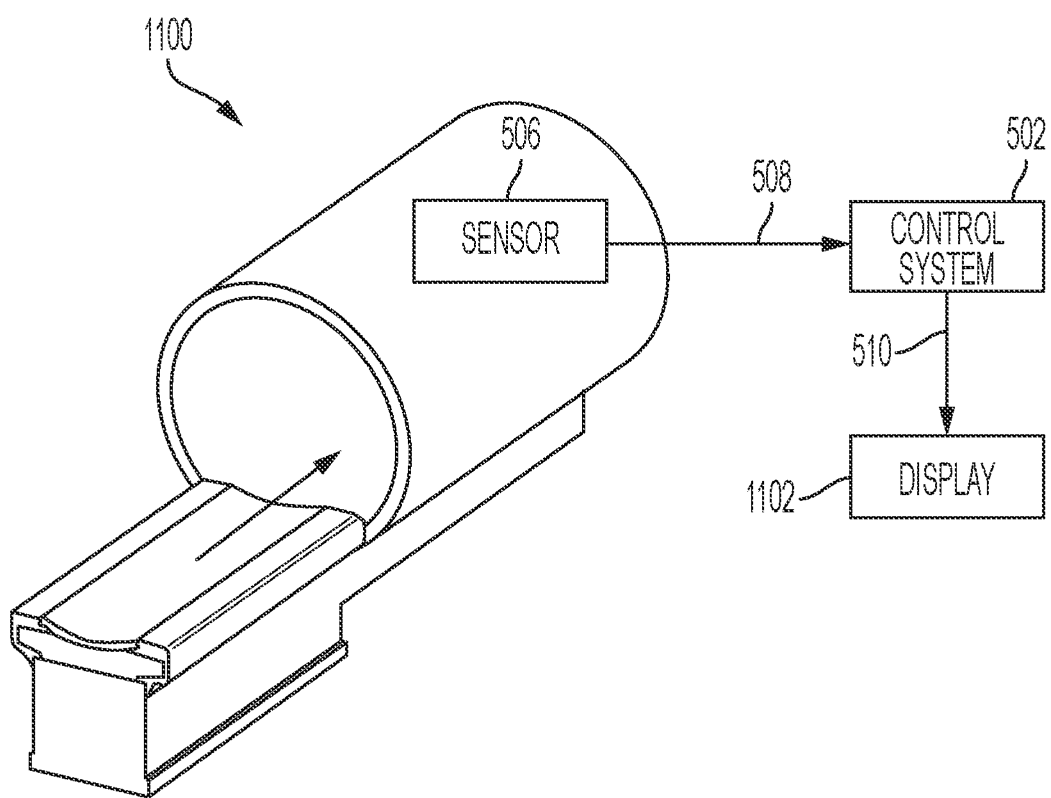
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments a method for performing at least one perception task associated with autonomous control of a vehicle includes receiving a first dataset, the first dataset including plurality of images corresponding to at least one environment of the vehicle, and identifying a first object category of objects associated with the plurality of images, the first object category including a plurality of object types. The method also includes identifying a current statistical distribution of a first object type of the plurality of object types and determining a first distribution difference between the current statistical distribution of the first object type and a standard statistical distribution associated with the first object category. The method also includes, in response to a determination that the first distribution difference is greater than a threshold, generating first object type data corresponding to the first object type. The method also includes configuring at least one attribute of the first object type data and generating a second dataset by augmenting the first dataset using the first object type data.

In some embodiments, the at least one attribute of the first object type data includes a location attribute. In some embodiments, the at least one attribute of the first object type data includes an orientation attribute. In some embodiments, the method also includes generating two-dimensional object data based on the first object type data. In some embodiments, augmenting the first dataset using the first object type data includes augmenting the first dataset to include the two-dimensional object data. In some embodiments, the method also includes generating three-dimensional object data based on the first object type data. In some embodiments, augmenting the first dataset using the first object type data includes augmenting the first dataset to include the three-dimensional object data. In some embodiments, the method also includes fusing two-dimensional object data associated with the first object type data with corresponding three-dimensional object data associated with the first object type data. In some embodiments, augmenting the first dataset using the first object type data includes augmenting the first dataset based on the fused two-dimensional object data and the three-dimensional object data. In some embodiments, the standard statistical distribution corresponds to a data distribution of the first object category. In some embodiments, the method also includes performing, by a machine learning model trained using the second dataset, at least one perception task associated with autonomous control of the vehicle.

In some embodiments, a system for performing at least one perception task associated with autonomous control of a vehicle includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution associated with the first object category; in response to a determination that the first distribution difference is greater than a threshold, generate first object type data corresponding to the first object type; configure at least one attribute of the first object type data; and generate a second dataset by augmenting the first dataset using the first object type data.

In some embodiments, the at least one attribute of the first object type data includes a location attribute. In some embodiments, the at least one attribute of the first object type data includes an orientation attribute. In some embodiments, the instructions further cause the processor to augment the first dataset further using two-dimensional object data associated with the first object type data. In some embodiments, the instructions further cause the processor to augment the first dataset further using three-dimensional object data associated with the first object type data. In some embodiments, the instructions further cause the processor to augment the first dataset further using fused two-dimensional object data and three-dimensional object data associated with the first object type data. In some embodiments, the standard statistical distribution corresponds to a data distribution of the first object category. In some embodiments, the instructions further cause the processor to train a machine learning model trained using the second dataset, the machine learning model being configured to perform at least one perception task associated with autonomous control of the vehicle.

In some embodiments, an apparatus for performing at least one perception task associated with autonomous control of a vehicle includes a processor and a memory. The memory includes instructions that, when executed by the processor, cause the processor to: receive a first dataset, the first dataset including plurality of images corresponding to at least one environment of the vehicle; identify a first object category of objects associated with the plurality of images, the first object category including a plurality of object types; identify a current statistical distribution of a first object type of the plurality of object types; determine a first distribution difference between the current statistical distribution of the first object type and a standard statistical distribution that corresponds to a data distribution of the first object category; in response to a determination that the first distribution difference is greater than a threshold, generate first object type data corresponding to the first object type; configure at least one attribute of the first object type data; generate a second dataset by augmenting the first dataset using the first object type data; train a machine learning model trained using the second dataset, the machine learning model being configured to perform at least one perception task associated with autonomous control of the vehicle; and perform at least one perception task of the vehicle using output provided by the machine learning model.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for performing at least one perception task associated with autonomous control of a vehicle, the method comprising:

receiving a first dataset, the first dataset including corresponding to at least one environment of the vehicle;

plurality of images identifying a first object category of objects associated with the plurality of images, the first object category including a plurality of object types;

identifying a current statistical distribution of a first object type of the plurality of object types;

determining a first distribution difference between the current statistical distribution of the first object type and a standard statistical distribution associated with the first object category;

in response to a determination that the first distribution difference is greater than a threshold, generating first object type data corresponding to the first object type;

configuring at least one attribute of the first object type data;

generating a second dataset by augmenting the first dataset using the first object type data:

training a machine learning model using the second dataset;

performing, using the machine learning model, at least one perception task associated with autonomous control of a vehicle;

receiving, from the machine learning model, an output associated with the at least one perception task; and providing the output associated with the at least one perception task to a controller of the vehicle, wherein the controller of the vehicle performs at least one autonomous vehicle control operation of the vehicle based on the output associated with the at least one perception task.

2. The method of claim 1, wherein the at least one attribute of the first object type data includes a location attribute.

3. The method of claim 1, wherein the at least one attribute of the first object type data includes an orientation attribute.

4. The method of claim 1, further comprising generating two-dimensional object data based on the first object type data.

5. The method of claim 4, wherein augmenting the first dataset using the first object type data includes augmenting the first dataset to include the two-dimensional object data.

6. The method of claim 1, further comprising generating three-dimensional object data based on the first object type data.

7. The method of claim 6, wherein augmenting the first dataset using the first object type data includes augmenting the first dataset to include the three-dimensional object data.

8. The method of claim 1, further comprising fusing two-dimensional object data associated with the first object type data with corresponding three-dimensional object data associated with the first object type data.

9. The method of claim 8, wherein augmenting the first dataset using the first object type data includes augmenting the first dataset based on the fused two-dimensional object data and the three-dimensional object data.

10. The method of claim 1, wherein the standard statistical distribution corresponds to a data distribution of the first object category.

11. A system for performing at least one perception task associated with autonomous control of a vehicle, the system comprising:

a processor; and a memory including instructions that, when executed by the processor, cause the processor to:

receive a first dataset, the first dataset including plurality of images corresponding to at least one environment of the vehicle;

identify a first object category of objects associated with the plurality of images, the first object category including a plurality of object types;

identify a current statistical distribution of a first object type of the plurality of object types;

determine a first distribution difference between the current statistical distribution of the first object type and a standard statistical distribution associated with the first object category;

in response to a determination that the first distribution difference is greater than a threshold, generate first object type data corresponding to the first object type;

configure at least one attribute of the first object type data;

generate a second dataset by augmenting the first dataset using the first object type data;

train a machine learning model using the second dataset;

perform, using the machine learning model, at least one perception task associated with autonomous control of a vehicle;

receive, from the machine learning model, an output associated with the at least one perception task; and provide the output associated with the at least one perception task to a controller of the vehicle, wherein the controller of the vehicle performs at least one autonomous vehicle control operation of the vehicle based on the output associated with the at least one perception task.

12. The system of claim 11, wherein the at least one attribute of the first object type data includes a location attribute.

13. The system of claim 11, wherein the at least one attribute of the first object type data includes an orientation attribute.

14. The system of claim 11, wherein the instructions further cause the processor to augment the first dataset further using two-dimensional object data associated with the first object type data.

15. The system of claim 11, wherein the instructions further cause the processor to augment the first dataset further using three-dimensional object data associated with the first object type data.

16. The system of claim 11, wherein the instructions further cause the processor to augment the first dataset further using fused two-dimensional object data and three-dimensional object data associated with the first object type data.

17. The system of claim 11, wherein the standard statistical distribution corresponds to a data distribution of the first object category.

18. An apparatus for performing at least one perception task associated with autonomous control of a vehicle, the apparatus comprising:

a processor, and a memory including instructions that, when executed by the processor, cause the processor to:

receive a first dataset, the first dataset including plurality of images corresponding to at least one environment of the vehicle;

identify a first object category of objects associated with the plurality of images, the first object category including a plurality of object types;

identify a current statistical distribution of a first object type of the plurality of object types;

determine a first distribution difference between the current statistical distribution of the first object type and a standard statistical distribution that corresponds to a data distribution of the first object category;

in response to a determination that the first distribution difference is greater than a threshold, generate first object type data corresponding to the first object type;

configure at least one attribute of the first object type data;

generate a second dataset by augmenting the first dataset using the first object type data;

train a machine learning model trained using the second dataset, the machine learning model being configured to perform at least one perception task associated with autonomous control of the vehicle; and perform, using the machine learning model at least one perception task of associated with autonomous control of the vehicle;

receive, from the machine learning model an output associated with the at least one perception task, and provide the output associated with the at least one perception task to a controller of the vehicle, wherein the controller of the vehicle performs at least one autonomous vehicle control operation of the vehicle based on the output associated with the at least one perception task.

* * * * *